(12) United States Patent
Auld

(10) Patent No.: US 6,357,932 B1
(45) Date of Patent: Mar. 19, 2002

(54) ADAPTER FOR COUPLING A BNC CONNECTOR TO AN SMA BUSHING

(75) Inventor: Michael D. Auld, Chesterfield, MO (US)

(73) Assignee: Synergetics, Inc., St. Charles, MO (US)

( * ) Notice: Subject to any disclaimer, the term of this patent is extended or adjusted under 35 U.S.C. 154(b) by 0 days.

(21) Appl. No.: 09/542,660

(22) Filed: Apr. 4, 2000

Related U.S. Application Data

(60) Provisional application No. 60/128,354, filed on Apr. 8, 1999.

(51) Int. Cl.$^7$ .................................................. G02B 6/36
(52) U.S. Cl. ............................................ 385/76; 385/56
(58) Field of Search ............................... 385/56, 60, 55, 385/53, 70, 138, 66, 81, 139, 92

(56) References Cited

U.S. PATENT DOCUMENTS

| 4,199,736 A |   | 4/1980  | McTaggart et al. |        |
|-------------|---|---------|------------------|--------|
| 4,553,814 A | * | 11/1985 | Bahl et al.      | 385/86 |
| 5,074,637 A | * | 12/1991 | Rink             | 385/56 |
| 5,085,492 A | * | 2/1992  | Kelsoe et al.    | 385/60 |
| 5,452,391 A | * | 9/1995  | Chou et al.      | 385/92 |
| 5,785,645 A |   | 7/1998  | Scheller         |        |
| 5,807,242 A |   | 9/1998  | Scheller et al.  |        |

* cited by examiner

Primary Examiner—Hemang Sanghavi
Assistant Examiner—Scott A Knauss
(74) Attorney, Agent, or Firm—Thompson Coburn LLP

(57) ABSTRACT

An assembly used to adapt a BNC type connector of a microsurgical optic fiber instrument to a threaded SMA type bushing of a light source includes an adapter that can be threaded on the bushing of the light source and is also connectable to the BNC connector.

25 Claims, 3 Drawing Sheets

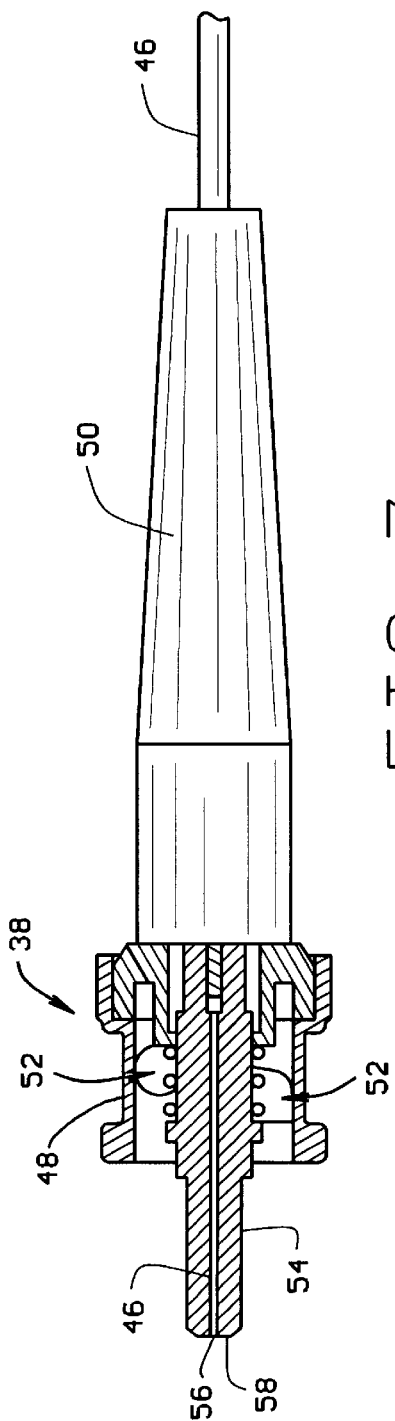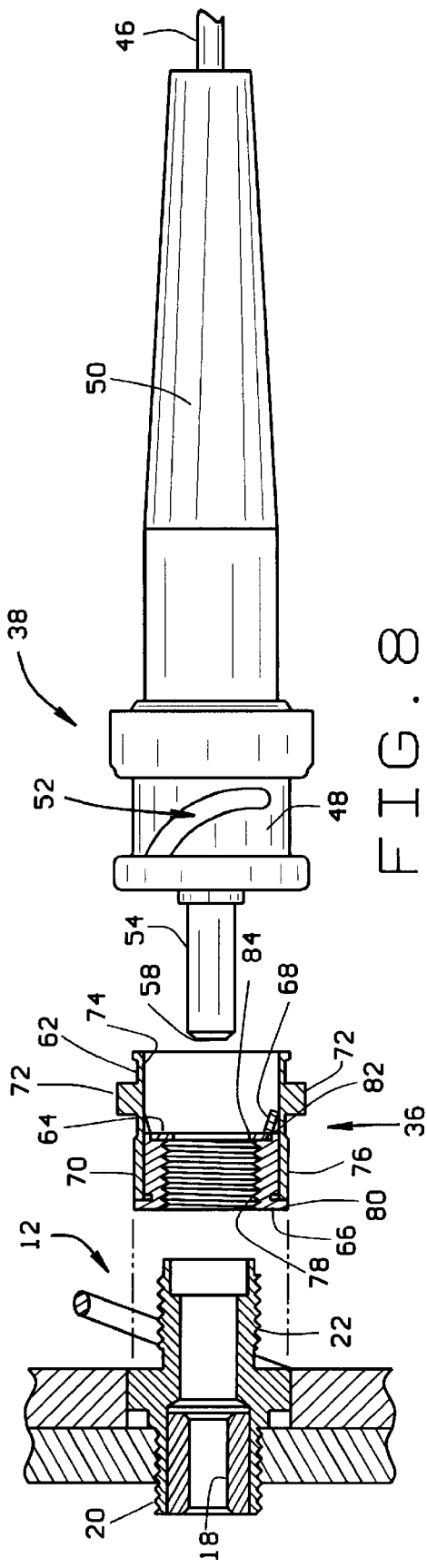

ADAPTER FOR COUPLING A BNC CONNECTOR TO AN SMA BUSHING

This is a continuation of copending application Ser. No. 60/128,354; filed on Apr. 8, 1999.

BACKGROUND OF THE INVENTION (1) Field of the Invention

The present invention pertains to an assembly that is used to adapt a BNC type connector of a microsurgical optic fiber instrument to a threaded SMA type bushing connector of a light source.

(2) Description of the Prior Art

In microsurgery such as ophthalmic surgery or surgery of the eye, various different types of instruments are available for use by the surgeon to deliver light to the interior of the eye. These instruments deliver light for illumination as well as laser light for use in surgery. A basic microsurgical instrument of this type is comprised of a handle with a projecting tubular probe or tip and a length of optic fiber entering the rearward end of the handle and passing through the handle and the tip to the tip distal end. The proximal end of the optic fiber opposite its connection to the handle is provided with a connector for connecting the fiber proximal end to a light source, either an illumination source or a laser light source. By positioning the proximal end of the optic fiber adjacent the light source, the light is transmitted through the fiber to its distal end and is emitted from the distal end. Where the light source is a source of laser light used in eye surgery, the positioning of the fiber proximal end relative to the laser light must be accurately controlled. Connectors employed for such a purpose are referred to as SMA type connectors.

FIGS. 1 and 2 show examples of prior art SMA connectors with FIG. 1 illustrating the construction of a male optic fiber connector and FIG. 2 illustrating the construction of a female optic fiber connector. These prior art connectors are widely used and will only be described generally.

The female connector or bushing 12 is provided with an alignment sleeve 18 in its interior that ensures a precise alignment of an optic fiber (not shown) extending through the male connector 10 along the male connector center axis 14. A laser light source is positioned relative to the female connector 12 to direct a beam of laser light along the female connector center axis 16. The female connector has a first set of external screw threading 20 that is employed in securing the female connector 12 to a wall or bracket of the laser light source to securely hold the female connector relative to the light source. A second set of external screw threading 22 on the female connector is employed in attaching the male connector 10 to the female connector.

The male connector 10 includes a center ferrule 24 on which a cable nut 26 is mounted for rotation. The cable nut 26 is secured on the ferrule 24 by a back post 28 that is screw threaded on the ferrule. The cable nut 26 has internal screw threading 30 that is complementary to the external screw threading 22 of the female connector. The optic fiber of the microsurgical instrument (not shown) passes through the back post 28 and the ferrule 24 with a distal end of the optic fiber being positioned adjacent the distal end of the ferrule 24.

In attaching the male connector 20 to the female connector 12, the ferrule 24 is first inserted through the interior bore of the female connector and into the alignment sleeve 18. The cable nut 26 is turned causing its internal threading 30 to be screw threaded onto the external threading 22 of the female connector and to securely connect the male connector 10 with the female connector 12 with their respective axes aligned. In this way, the beam of laser light of the light source (not shown) is directed at the exposed end of the optic fiber contained in the male connector 10.

Use of the prior art connectors described above has been found to be inconvenient in that it is necessary to completely unscrew the cable nut 26 of the male connector 10 from the external screw threading 22 of the female connector 12 when removing one instrument from the light source and then screw a cable nut 26 of another instrument onto the female connector external threading 22 when switching one microsurgical instrument for another. It would be more convenient if the male connector 10 could be quickly connected with and disconnected from the female connector 12 without requiring repeated rotations of a cable nut in connecting and disconnecting the two connectors.

The prior art also includes laser light sources having female connectors 12 and sets of microsurgical instruments having male connectors 10 that can only be used with each other. This has been found to be inconvenient when it is desirable to use other types of microsurgical instruments with the particular laser light source. The prior art laser light source is specifically designed so that it will not operate if a male connector of a microsurgical instrument is connected to the light source where the microsurgical instrument and male connector are not manufactured by the particular manufacturer of the light source. This is accomplished by encoding the male connector 10 of the surgical instrument with an electronic device that is recognized by the light source when the male connector is attached to the female connector of the light source. An example of such a male connector and female connector is disclosed in the U.S. patent of Kelsoe et al. U.S. Pat. No. 5,085,492.

The above-described inconvenience could be overcome by an adapter that can be attached to the female connector of a laser light source of the type that operates only with associated electronically encoded surgical instruments where the adapter contains the electrical device recognized by the light source and also enables a quick connect and disconnect of the surgical instrument to the adapter.

SUMMARY OF THE INVENTION

The present invention overcomes the inconveniences of prior art SMA type connectors described above by providing an adapter that enables a BNC type connector to be attached to the external screw threading of a female connector or bushing of the SMA type. In addition, the adapter also is electronically encoded and therefore enables use of any type of surgical instrument having a BNC type connector with a laser light source of the type that only recognizes electronically encoded surgical instruments.

The adapter of the invention is part of an assembly that includes a microsurgical optic fiber instrument having a BNC type connector in lieu of a SMA type connector usually found on these types of surgical instruments. Like the SMA connector, the BNC connector also has a center ferrule that projects from the connector and through which the optic fiber extends. However, instead of having the cable nut found on SMA connectors, the BNC connector of the invention has a conventional BNC type connector including a cylindrical collar with a pair of spiraling slots formed in the collar.

The adapter includes a cylindrical adapter sleeve constructed of a conductive material, preferably metal. The sleeve has an external surface with a pair of posts projecting from the surface on diametrically opposite sides of the sleeve. The posts are positioned to be engaged by the slots of the BNC connector to enable the BNC connector to be attached to the exterior surface of the sleeve by merely turning the BNC connector one quarter turn relative to the sleeve. The sleeve also has a cylindrical interior surface and a cylindrical insulator is secured inside the sleeve. The insulator does not extend through the entire length of the sleeve but is only positioned adjacent the end of the sleeve to be attached to the externally threaded female bushing of the laser light source of the type described earlier. The insulator has internal screw threading that is complementary to that of the female bushing of the laser light source. Screwing the insulator threading onto the external threading of the light source female bushing attaches the sleeve to the light source female bushing but insulates the conductive material of the sleeve from that of the bushing.

An annular conductive stop is also secured in the interior of the adapter sleeve. The stop is positioned in the adapter sleeve where it will come into electrical contact with the female bushing of the laser light source when the adapter sleeve is attached to the female bushing.

An electrical device is also secured to the interior of the adapter sleeve. The electrical device is connected electrically between the annular stop and the interior surface of the sleeve, thus establishing a circuit path from the annular stop to the sleeve through the electrical device. In the preferred embodiment of the invention, the electrical device is a resistor. However, other electrical devices as well as combinations of electrical devices may be employed in lieu of the resistor.

In use of the assembly, the adapter sleeve is first attached to the external threading of the laser light source female bushing by screw threading the insulator of the sleeve onto the female bushing until the end of the female bushing comes into contact with the annular stop inside the sleeve. This establishes a circuit path from the female bushing through the annular stop, the electrical device and the conductive sleeve of the adapter. With the adapter attached to the female bushing of the laser light source, any optic fiber microsurgical instrument having the BNC connector of the invention may be easily connected and disconnected from the laser light source by turning the BNC connector one quarter turn relative to the adapter attached to the laser light source.

When the BNC connector of the surgical instrument is attached on the adapter, an electric circuit is established from the female bushing of the laser light source through the annular stop, the electrical device, the adapter and now the collar of the BNC connector. The prior art laser light source discussed above also includes an external contact that is positioned to come into contact with the cable nut of a conventional SMA type connector when attached to the female bushing of the light source. This external contact comes into contact with the BNC connector of the assembly and thereby a complete electrical circuit is established from the female bushing of the light source through the electrical device of the adapter and through the BNC connector and the external contact of the light source.

The electrical device, for example the resistor referred to, is specifically chosen to make the adapter compatible with the particular light source. When the electric circuit discussed above is established by connecting the adapter and BNC connector of the invention with the female bushing of the light source, the light source recognizes the particular electrical device provided in the adapter. Thus, the laser light source will operate as though an SMA connector manufactured by the same manufacturer of the light source was connected to the female bushing of the light source.

Thus, the assembly of the invention including the adapter and the BNC connector enables a quick connect and disconnect of the surgical instrument with the laser light source and also enables surgical instruments to be employed with the particular light source that were not manufactured by the particular manufacturer of the light source.

DETAILED DESCRIPTION OF THE DRAWINGS

Further objects and features of the invention will be revealed in the following detailed description of the preferred embodiment of the invention and in the drawing figures wherein:

FIG. 7 is a side partially sectioned view of the BNC connector of the invention shown in FIG. 6; and FIG. 8 is a side view illustrating the attachment of the adapter of the invention onto the female bushing of a laser light source and the attachment of the BNC connector of the invention to the adapter.

DESCRIPTION OF THE PREFERRED EMBODIMENT

The assembly of the invention includes an adapter 36 and a BNC connector 38 for a microsurgical optic fiber instrument 40 that transmits laser light used in surgery. Alternatively, the optic fiber instrument could be employed to provide illumination to a surgical site. The adapter 36 enables the BNC connector 38 to be attached to the external screw threading of a female connector or bushing of the SMA type employed on a laser light source such as that disclosed in the earlier references U.S. Pat. No. 5,085,492. The adapter 36 also enables the microsurgical instrument 40 to be quickly and easily connected to and disconnected from the bushing without repeatedly rotating the connector to screw it on or unscrew it from the bushing as is required by prior art SMA instrument connectors. In addition, the adapter is also electrically encoded and enables use of any type of surgical instrument having a BNC type connector with a laser light source of the type that only recognizes electrically encoded surgical instruments.

Figure 6:
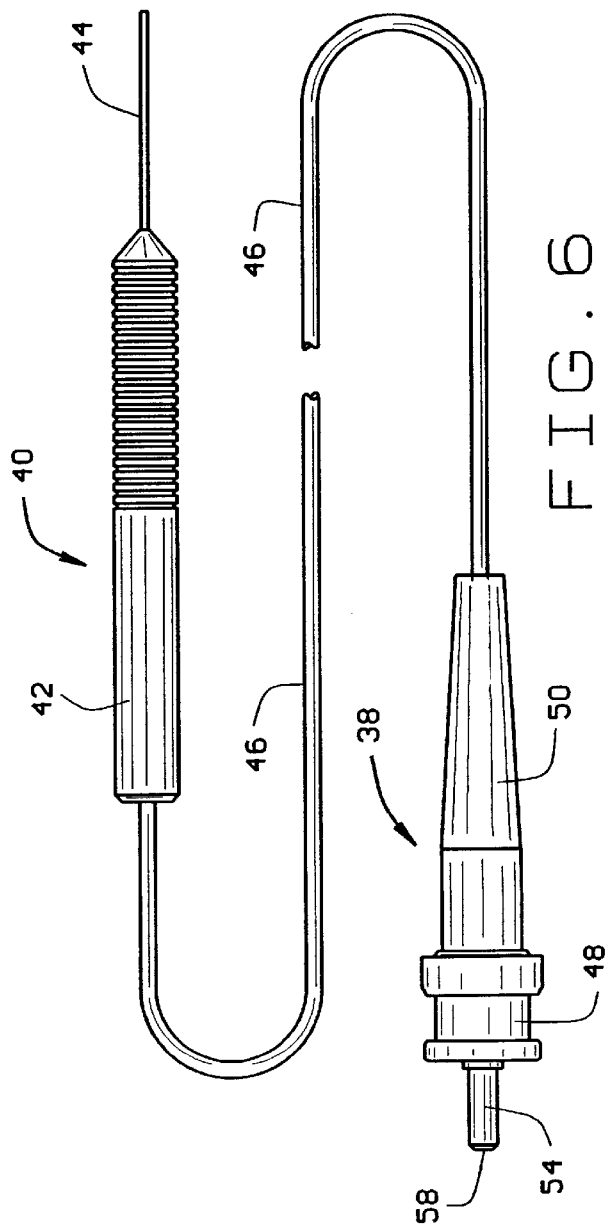
FIG. 6 is side view of a microsurgical instrument employing a BNC type connector of the invention.

The surgical instrument 40 and the BNC connector 38 of the invention are shown in FIG. 6. In this illustrative embodiment of the invention, the surgical instrument 40 is a laser probe. The construction of the surgical instrument is, for the most part, conventional and will only be described briefly. The instrument includes a handle 42 having a bore passing axially through its center. A tubular metal tip 44 or probe is secured to one end of the handle and communicates with the handle interior bore. An optic fiber 46 protected by an external layer of cladding extends into the handle bore at the opposite end of the handle from the tip 44. In the handle 42, the cladding is removed from the optic fiber and only the optic fiber extends through the tip 44 to a distal end of the fiber adjacent the distal end of the tip. The opposite end of the optic fiber extends into the BNC connector 38 of the invention.

The BNC connector 38 is basically a conventional BNC connector that is typically used as an electronic connector. Because the construction of the BNC connector is, for the most part, conventional, it will not be described in detail. The connector includes a cylindrical collar 48 that is mounted on a body 50 of the connector for rotation relative thereto. The collar 48 is constructed of a conductive material. The collar includes a pair of diametrically opposite grooves or slots 52. The slots 52 spiral around the collar 48 for one quarter of the circumference of the collar. A center ferrule 54 projects from the connector 38 through the center of the collar 48. The exterior of the ferrule 54 is dimensioned to fit tightly in the alignment sleeve 18 of the female connector or bushing 12 of the laser light source (not shown). The BNC connector 38 differs from prior art BNC connectors in that the optic fiber 46, with the cladding removed, extends through the center of the connector ferrule 54 with the proximal end 56 of the optic fiber being positioned adjacent the end 58 of the ferrule. Thus, with the ferrule securely inserted in the alignment sleeve 18 of the female connector 12 of the light source, the proximal end of the optic fiber 56 is accurately positioned relative to the laser light source.

Figure 1:
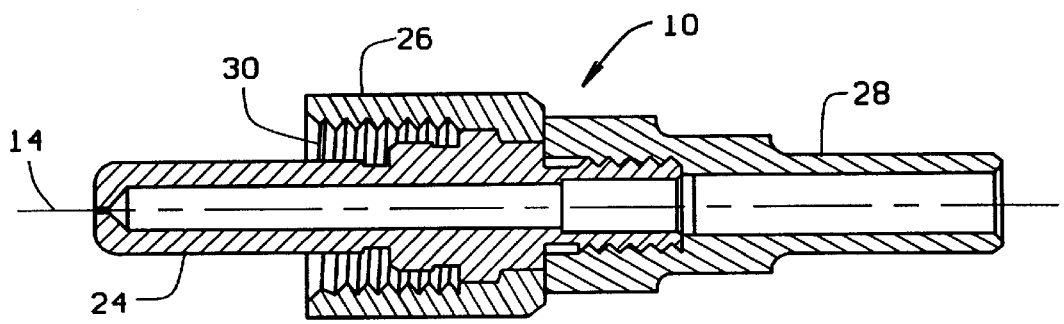
FIG. 1 is a side-sectioned view of a prior art SMA type male connector employed with optic fiber microsurgical instruments.
Figure 2:
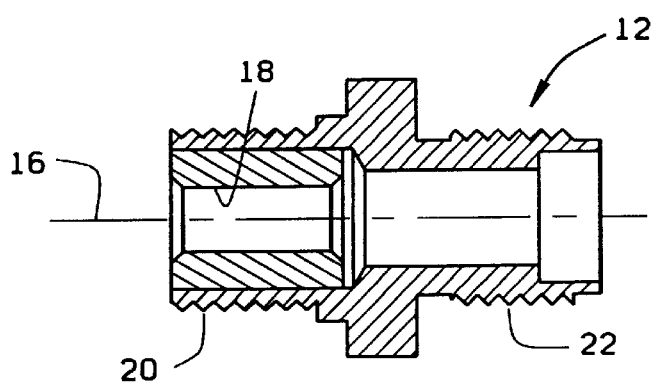
FIG. 2 is a side-sectioned view of a prior art female connector employed with the male connector of FIG. 1.
Figure 3:
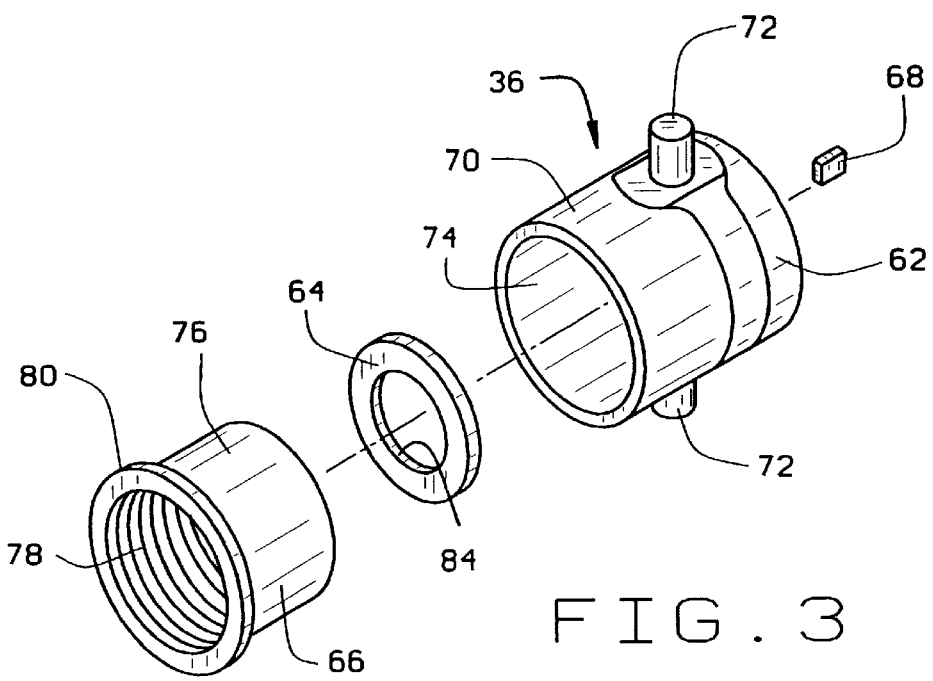
FIG. 3 is a perspective, exploded view of the adapter of the invention.
Figure 5:
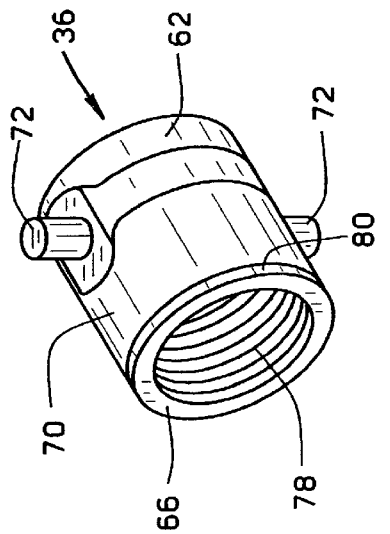
FIG. 5 is a perspective view of the adapter of the invention.
Figure 4:
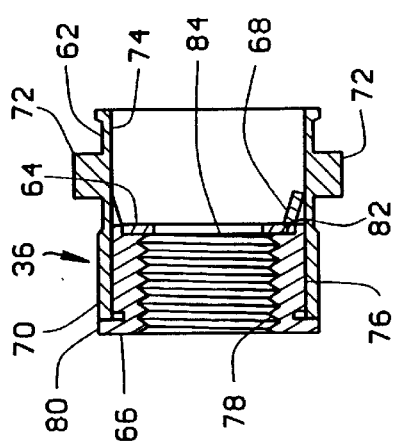
FIG. 4 is a side-sectioned view of the adapter of the invention.

The adapter 36 of the invention is shown in FIGS. 3–5. The adapter is basically comprised of a cylindrical conductive sleeve 62, an annular conductive stop 64, a cylindrical insulator 66 and an electronic device 68, in the illustrated embodiment a resistor 68.

The adapter sleeve 62 has an external surface 70 that is dimensioned to fit inside the cylindrical collar 48 of the BNC connector 38 and engage in electrical contact therewith. A pair of posts 72 project from the sleeve external surface 70 on diametrically opposite sides of the sleeve. The posts 72 are positioned on the sleeve to engage in the pair of slots 52 of the BNC connector collar 48 when attaching the connector to the adapter. The engagement of the posts 72 in the adapter collar slots 52 enables the BNC connector 38 to be attached on the external surface 70 of the adapter by merely rotating the BNC connector one quarter turn. Thus, the BNC connector 38 can also be disconnected from the external surface of the adapter 36 by turning the BNC connector one quarter turn in the opposite direction. The sleeve also has a cylindrical interior surface 74 surrounding an internal bore of the sleeve.

The insulator 66 is cylindrical and has an external surface 76 dimensioned to fit tightly into the internal surface 74 of the sleeve. The insulator 66 is constructed of an insulating material. The interior surface of the insulator is provided with internal screw threading 78 that is complementary to the external screw threading 22 of the female connector 12 of the laser light source. One end of the insulator has a circular flange 80 that engages against the end of the adapter sleeve 62 when inserting the insulator into the adapter. The opposite end of the insulator has an annular recessed shoulder 82. The insulator 66 is inserted into the interior of the adapter sleeve 62 at the end of the sleeve opposite the pair of posts 72 as shown in FIGS. 3 and 4. The insulator is secured in place by an epoxy or by other equivalent means.

The annular stop 64 is basically a circular brass washer that is dimensioned to fit inside the annular recessed shoulder 82 of the insulator as shown in FIG. 4. The stop has a circular inner surface 84 that is dimensioned slightly smaller than the interior diameter of the threaded bore 78 of the insulator. The brass stop 64 is conductive and is positioned to come into electrical contact with the end of the female bushing 12 of the laser light source when the adapter 36 is screw threaded onto the bushing. The stop 64 is secured in the recess 82 of the insulator by an epoxy or by other equivalent means.

The electrical device 68, in the preferred embodiment a resistor, is secured to the adapter sleeve interior surface 74 by an epoxy or other equivalent means. The device 68 is connected electrically with the annular stop 64 and the internal surface 74 of the adapter sleeve 62, thus creating an electric circuit between the annular stop 64 and the adapter sleeve 62. In alternative embodiments, the resistor of the electrical device 68 could be replaced with some other type of electrical device or a combination of electrical devices depending on what would be recognized by the light source the adapter is to be used with.

In use of the assembly illustrated in FIG. 8, the adapter sleeve 62 is first attached to the external threading 22 of the laser light source female bushing by screw threading the insulator 66 of the sleeve onto the female bushing until the end of the female bushing comes into contact with the annular stop 64 inside the sleeve. This establishes a circuit path from the female bushing 12 through the annular stop 64, the electrical device 68 and the conductive sleeve 62 of the adapter. With the adapter attached to the female bushing of the laser light source, any optic fiber microsurgical instrument having the BNC connector of the invention may be easily connected and disconnected from the laser light source by turning the BNC connector one quarter turn relative to the adapter attached to the laser light source.

When the BNC connector 38 of the surgical instrument is attached on the adapter 36, an electric circuit is established from the female bushing 12 of the laser light source through the annular stop 64, the electrical device 68, the adapter sleeve 62 and now the collar 48 of the BNC connector. The prior art laser light source discussed above also includes an external contact 88 that is positioned to come into contact with the cable nut of a conventional SMA type connector when attached to the female bushing of the light source. This external contact 88 comes into contact with the BNC connector 38 of the assembly and thereby a complete electrical circuit is established from the female bushing 12 of the light source through the electrical device 68 of the adapter and through the BNC connector 38 and the external contact 88 of the light source.

The electrical device, for example the resistor 68 referred to, is specifically chosen to make the adapter compatible with the particular light source. When the electric circuit discussed above is established by connecting the adapter and BNC connector of the invention with the female bushing of the light source, the light source recognizes the particular electrical device provided in the adapter. Thus, the laser light source will operate as though an SMA connector manufactured by the same manufacturer of the light source was connected to the female bushing of the light source.

Thus, the assembly of the invention including the adapter and the BNC connector enables a quick connect and disconnect of the surgical instrument with the laser light source and also enables surgical instruments to be employed with the particular light source that were not manufactured by the particular manufacturer of the light source.

While the present invention has been described by reference to a specific embodiment, it should be understood that modifications and variations of the invention may be constructed without departing from the scope of the invention defined in the following claims.

What is claimed:

1. An adapter for enabling a quick connect and disconnect between an externally threaded bushing and a BNC connector, the adapter comprising:

a cylindrical sleeve having an external surface and an internal surface, a portion of the internal surface having internal screw threading that is complementary to external screw threading of a bushing to which the sleeve is to be attached, at least one post on the external surface of the sleeve, the post being positioned to engage with a slot of a BNC connector to hold the BNC connector on the sleeve exterior surface; and an insulator is inserted into the sleeve and the internal screw threading is on the insulator.

2. The adapter of claim 1, wherein:

a pair of posts are positioned on opposite sides of the sleeve exterior surface to engage with slots of a BNC connector to hold the BNC connector on the sleeve exterior surface.

3. The adapter of claim 1, wherein:

a conductive stop is secured inside the sleeve adjacent the insulator.

4. The adapter of claim 3, wherein:

the conductive stop is insulated from the sleeve by the insulator.

5. The adapter of claim 3, wherein:

an electrical device is secured inside the sleeve and is electrically connected between the sleeve and the conductive stop.

6. The adapter of claim 5, wherein:

the electrical device is a resistor.

7. An assembly for connecting an optic fiber instrument to an externally threaded bushing of a light source, the assembly comprising:

a BNC connector having a cylindrical collar with a center axis, the collar having at least one slot therein that spirals around the center axis of the collar;

a cylindrical sleeve adapter having a center axis, an external surface and an internal surface, a portion of the internal surface having internal screw threading that is complementary to external screw threading of a bushing of a light source to which the sleeve is to be attached, at least one post on the sleeve positioned to engage in the slot of the BNC connector to hold the collar of the BNC connector on the external surface of the sleeve; and the cylindrical sleeve is a conductor and an insulator is inserted inside the sleeve, the insulator has an exterior surface in engagement with the sleeve interior surface and the insulator has an internal bore and the internal screw threading of the sleeve is in the internal bore of the insulator.

8. The assembly of claim 7, wherein:

the collar slot is shaped to cause the collar to be attached on the external surface of the sleeve by the post engaging in the slot in response to rotating the collar one quarter turn relative to the sleeve.

9. The assembly of claim 7, wherein:

the sleeve has a pair of posts positioned on opposite sides of the sleeve exterior surface and the collar of the BNC connector has a pair of slots on opposite sides of the collar, the pair of slots are shaped to cause the collar to be attached on the external surface of the sleeve by the pair of posts engaging in the pair of slots in response to rotating the collar one quarter turn relative to the sleeve.

10. The assembly of claim 7, wherein:

the insulator insulates the cylindrical sleeve from the bushing of the light source when the sleeve adapter is threaded onto the bushing of the light source.

11. The assembly of claim 7, wherein:

a conductive stop is secured inside the adapter sleeve and is electrically insulated from the sleeve by the insulator, the stop is positioned inside the sleeve to make electrical contact with the bushing of the light source when the adapter sleeve is threaded on the bushing of the light source.

12. The assembly of claim 11, wherein:

an electrical device is secured inside the sleeve and is electrically connected between the sleeve and the conductive stop.

13. The assembly of claim 12, wherein:

the electrical device is a resistor.

14. An adapter for enabling a quick connect and disconnect between an externally threaded bushing of a light source and a BNC connector of an optic fiber instrument, the adapter comprising:

a cylindrical sleeve having an external surface an internal surface, a portion of the internal surface having internal screw threading that is complementary to external threading of a light source bushing to which the sleeve is to be attached, at least one post on the external surface of the sleeve, the post being positioned to engage with a slot of a BNC connector of an optic fiber instrument to hold the BNC connector on the sleeve exterior surface; and an electrical device is secured inside the sleeve where the electrical device is connected to an electric circuit with the light source bushing and the BNC connector when the sleeve internal screw threading is mounted on the light source bushing external screw threading and the BNC connector is mounted on the sleeve exterior surface.

15. The adapter of claim 14, wherein:

the electrical device is electrically connected to the sleeve.

16. The adapter of claim 14, wherein:

a conductive stop is secured inside the sleeve and the electrical device is electrically connected to the conductive stop.

17. The adapter of claim 16, wherein:

an insulator is inserted into the sleeve and the conductive stop is insulated from the sleeve by the insulator.

18. The adapter of claim 17, wherein:

the internal screw threading is on the insulator.

19. The adapter of claim 16, wherein:

the electrical device is electrically connected between the conductive stop and the sleeve.

20. An assembly for connecting an optic fiber instrument to an externally threaded bushing of a light source, the assembly comprising:

a BNC connector having a cylindrical collar with a center axis, the collar having at least one slot therein that spirals around the center axis of the collar;

a cylindrical sleeve adapter having a center axis, an external surface and an internal surface, a portion of the internal surface having internal screw threading that is complementary to external screw threading of a bushing of a light source to which the sleeve is to be attached, at least one post on the sleeve positioned to engage in the slot of the BNC connector to hold the collar of the BNC connector on the external surface of the sleeve; and an electrical device is secured inside the sleeve.

21. The assembly of claim 20, wherein:

the electrical device is electrically connected to the sleeve.

22. The assembly of claim 20, wherein:

a conductive stop is secured inside the sleeve and the electrical device is electrically connected to the conductive stop.

23. The assembly of claim 22, wherein:

an insulator is inserted into the sleeve and the conductive stop is insulated from the sleeve by the insulator.

24. The assembly of claim 23, wherein:

the internal screw threading is on the insulator.

25. The assembly of claim 22, wherein:

the electrical device is electrically connected between the conductive stop and the sleeve.

* * * * *